UNITED STATES PATENT OFFICE.

J. R. HATHAWAY, OF WESTFIELD, NEW YORK.

IMPROVED COMPOSITION FOR THE MANUFACTURE OF BURIAL-CASES.

Specification forming part of Letters Patent No. 83,495, dated October 27, 1868.

*To all whom it may concern:*

Be it known that I, J. R. HATHAWAY, of Westfield, in the county of Chautauqua and State of New York, have invented a new and Improved Composition for Burial-Cases; and I do hereby declare that the following is a full, clear, and exact description thereof, which will enable others skilled in the art to make and use the same.

This invention relates to improvements in burial-cases; and consists of an improved composition of matter for constructing the same, either wholly or in part, or for ornamenting the same.

I take twenty pounds paper, reduced to pulp, ten pounds glue, seven pounds rosin, three pints of oil, one quart silicate of soda, and thirty-four pounds of whiting, and mix together, which forms a plastic substance that may be readily molded to any desired shape, and which, when dry, becomes very hard and tenacious, and is an excellent and durable material for forming burial-cases impervious to water, light, strong, and cheap, and may be used alone or in combination with wood or other material, and may be molded in sections, or all, except the top or cover, in one piece.

If it is designed to be used in combination with other material, as wood, a case of wood, or the several parts thereof, may be placed in the mold, and the plastic material placed thereon in the mold, and when it becomes hard it will unite very firmly with the wood portion. I am thereby enabled to produce very elaborate ornamentation at but little cost, as the molds wherein the reverse of the ornamentation is wrought will last a great length of time, and serve to reproduce any indefinite number.

Having thus described my invention, I claim as new and desire to secure by Letters Patent—

1. The compound herein described, substantially as and for the purpose described.
2. Burial-cases made either wholly of the compound herein described, or in part of the same and wood or other suitable material, as a new article of manufacture, substantially as and for the purpose set forth.

J. R. HATHAWAY.

Witnesses:
 WILLIAM SEXTON,
 O. L. MCDONALD.